US011487550B1

(12) United States Patent
Bevis et al.

(10) Patent No.: US 11,487,550 B1
(45) Date of Patent: Nov. 1, 2022

(54) EVENT COMMUNICATION MANAGEMENT

(71) Applicant: Amazon Technologies, Inc., Reno, NV (US)

(72) Inventors: Troy Lawson Bevis, Seattle, WA (US); Nathan Pritchard, Redmond, WA (US); Robert Charles Swanson, Olympia, WA (US); Tinghui Wang, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/113,625

(22) Filed: Dec. 7, 2020

(51) Int. Cl.
| | |
|---|---|
| *G06F 9/4401* | (2018.01) |
| *G06F 9/54* | (2006.01) |
| *G06F 13/20* | (2006.01) |
| *G06F 11/30* | (2006.01) |
| *G06F 11/34* | (2006.01) |
| *G06F 13/42* | (2006.01) |

(52) U.S. Cl.
CPC ............ *G06F 9/4401* (2013.01); *G06F 9/542* (2013.01); *G06F 9/546* (2013.01); *G06F 11/3041* (2013.01); *G06F 11/3476* (2013.01); *G06F 11/3495* (2013.01); *G06F 13/20* (2013.01); *G06F 13/4282* (2013.01); *G06F 2213/0016* (2013.01)

(58) Field of Classification Search
CPC ........ G06F 9/4401; G06F 9/542; G06F 9/546; G06F 11/3041; G06F 11/3476; G06F 11/3495; G06F 13/20; G06F 13/4282; G06F 11/0766

USPC .......................................................... 713/2
See application file for complete search history.

(56) References Cited

U.S. PATENT DOCUMENTS

| | | | |
|---|---|---|---|
| 10,387,672 B1 * | 8/2019 | Harland | G06F 21/85 |
| 10,489,338 B1 * | 11/2019 | Chien | G06F 9/4411 |
| 10,725,519 B1 * | 7/2020 | Misra | G06F 1/26 |
| 2004/0228063 A1 * | 11/2004 | Hawkins | G06F 13/4291 361/115 |
| 2007/0088816 A1 * | 4/2007 | Hrustemovic | G06F 11/3027 709/224 |
| 2008/0005377 A1 * | 1/2008 | Lambert | G06F 11/0784 710/15 |
| 2008/0059784 A1 * | 3/2008 | Fu | H04L 12/66 713/2 |
| 2010/0115257 A1 * | 5/2010 | Hoang | G06F 11/1666 717/174 |
| 2014/0032641 A1 * | 1/2014 | Du | G06F 9/455 709/203 |

(Continued)

*Primary Examiner* — Paul R. Myers
(74) *Attorney, Agent, or Firm* — Hogan Lovells US LLP

(57) ABSTRACT

Approaches in accordance with various embodiments provide for the management of system event data in a computing device. In particular, various embodiments provide an intelligent persistent buffer for system event log (SEL) messages. A SEL message can be generated by system BIOS on a computing device, which can send this message over an appropriate interface to a target recipient, such as the BMC. Instead of being received directly to the BMC, however, the SEL message can be received to a logic device, such as a CPLD, that is able to analyze the message, determine that the message relates to an important system event, and can cause this message to be stored to a persistent buffer. The BMC can then subsequently request the buffered SEL message from the logic device to take an appropriate action.

20 Claims, 6 Drawing Sheets

(56) References Cited

U.S. PATENT DOCUMENTS

| | | | |
|---|---|---|---|
| 2015/0032784 A1* | 1/2015 | Hu | G06F 11/0778 |
| | | | 707/827 |
| 2016/0261455 A1* | 9/2016 | Su | H04L 41/069 |
| 2017/0220802 A1* | 8/2017 | Huang | G06F 9/4401 |
| 2021/0117266 A1* | 4/2021 | Butcher | G06F 11/0787 |
| 2021/0326208 A1* | 10/2021 | Liang | G06F 11/0787 |

* cited by examiner

EVENT COMMUNICATION MANAGEMENT

BACKGROUND

In order to manage various computing resources, informational messages such as system event logs can be used to indicate when there is an occurrence detected with respect to one or more of these resources. Occurrences of interest can be of various types, such as for memory corruption or incorrect configuration. These system event logs can be used to diagnose and act on such occurrences. In some cases, however, a recipient of a system event log message may be unable, or at least slow, to accept that message, such as may be due to an update, reboot, or system error. Such an occurrence can result in a missed system event log message from the BIOS, and thus missed critical event information.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for the management of system event data in a computing device. In particular, various embodiments provide an intelligent persistent buffer for messages such as system event log (SEL) messages. In at least one embodiment, an error can be detected that causes a message, such as a SEL message, to be generated by a source, such as the basic input/output system (BIOS) on a computing device. The source can send this message over an appropriate channel to a target recipient, such as the baseboard management controller (BMC). Instead of being received directly to the BMC, however, the SEL message can be received to a logic device, referred to herein as a SEL device, that is able to analyze the message. The SEL device can determine that a received message relates to an important system event, and can cause this message to be stored to a persistent buffer, which may be internal or external to the SEL device. Storage of this SEL message to persistent storage has benefits such as providing protection against a power event, as well as enabling the data to be received to the BMC asynchronously in the event of a delay or temporary unavailability of the BMC. When ready, the BMC can request any buffered SEL messages from the SEL device, which can then transmit these buffered SEL messages to the BMC for processing. The BMC can perform an appropriate action upon receiving and processing the SEL messages, such as sending information to a backend service for analysis or remedial action. The persistent buffer can also enable a separate component, application, or system to obtain the SEL data at an appropriate time.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1A:
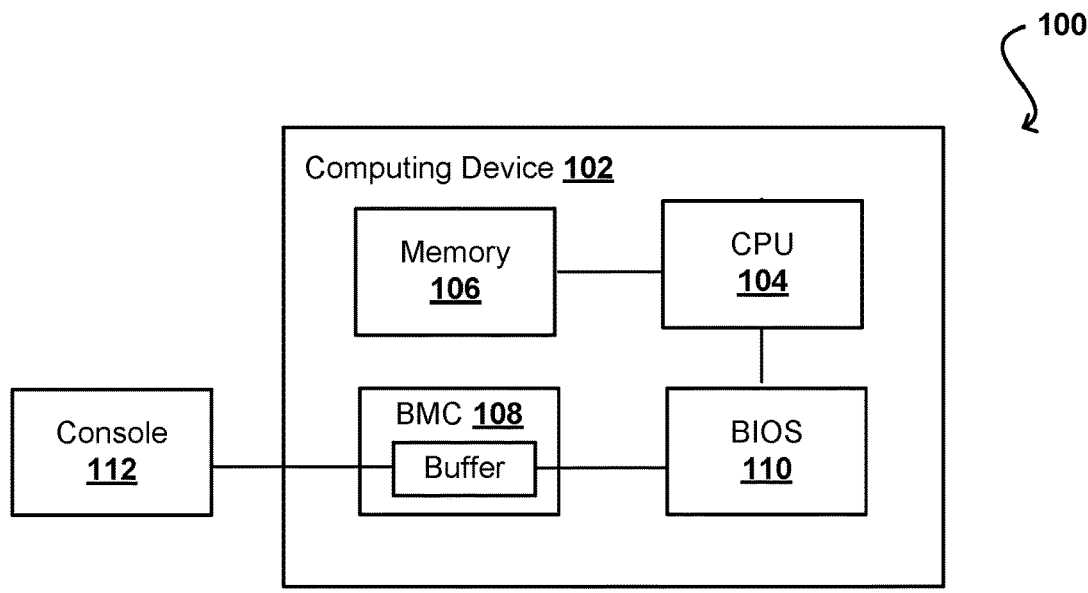
FIGS. 1A and 1B illustrate computing device configurations that can be utilized in accordance with various embodiments.

FIG. 1A illustrates an example configuration 100 that can be utilized in accordance with various embodiments. In this example, a computing device 102 includes at least one processor, such as a central processing unit (CPU) 104, as well as resident memory 106. During a boot of this computing device, a Basic Input/Output System (BIOS) component 110 can be utilized to perform tasks such as hardware initialization before operation of the computing device 102 is turned over to the CPU 104 for tasks such as running user applications. A BIOS component 110 can be programmed to perform one or more tests at boot time to verify whether this computing device 102 satisfies requirements for a proper boot. If the test (e.g., POST) is successful, then the BIOS can pass control over to the operating system (OS) executing on the CPU 104.

It might be the case that the BIOS encounters a system event during the boot process. A system event may correspond to a problem detected by the BIOS during a boot. In various embodiments, the BIOS may generate a system event log (SEL) message. The BIOS may cause this SEL message to be sent to a specific recipient, such as a baseboard management controller (BMC) 108 on the computing device 102. These SEL messages can serve as one way of notifying the infrastructure of a resource provider environment, for example, of problems with hardware in that environment. For example, a SEL message might indicate a problem with a processor or memory on a particular server in the environment. A SEL message might initiate from a source, such as system BIOS 110, on that server, and be sent to the BMC. In some embodiments, the BMC may then forward the message to a system event manager or other such component. In this example, a user such as a technician can utilize a console 112 or other interface to access these SEL messages as transmitted from a buffer on the BMC 108. In this example, these SEL messages or related data can be stored to this buffer for subsequent analysis. As mentioned, system event logs can be useful for resources such as managed servers, such as those offered through Amazon Web Services, Inc. (AWS). System event logs can correspond to notifications, from a lowest level of a resource stack on a resource, for example, that something of interest has happened on, or with respect to, that resource. As mentioned, this may correspond to a memory corruption error that has occurred on a managed server, a processing error that has occurred, or an incorrect configuration that has been identified, among other such options.

In the example configuration 100 of FIG. 1A, the BIOS component 110 can send system event log messages to the BMC using a bus, such as a system management bus (SMBus) between the chipset and the BMC using a protocol such as SSIF (SMBus System Interface). The BMC software accepts incoming SELs and adds them to an internal buffer, where these messages can later be read by services or technicians as a record of hardware events such as bad memory sticks, and the like.

In such an implementation, the BMC 108 can act as a target SMBus device for the BIOS 110, where the BMC firmware can be responsible for accepting the incoming SEL event via SSIF. It may be the case, however, that the BMC is unable to accept these SEL events, such as during firmware updates, BMC reboots, or in the case of degraded BMC firmware. An inability to accept these events can result in one or more missed SEL events from the BIOS 110, and therefore missed critical server events or other such information. Other times the BMC 108 may be slow to accept a SEL event from the BIOS 110. High latency from the BMC 108 can result in delays in critical sections of the BIOS 110 when sending SEL events to the BMC 108. One critical section can relate to system management interrupts (SMIs), when the processor may stop all current user operations to handle an unexpected event. While in a SMI, no user data or application processing is performed. There may be cases where the BMC may take several seconds to accept a SEL event, meaning that a user or application is unable to execute any workload for an extended period of time. Thus, any SMI delay can take processing resources away for a period of time, and in some cases such a delay can lead to crashed instances due to a hang in the hypervisor.

Figure 1B:
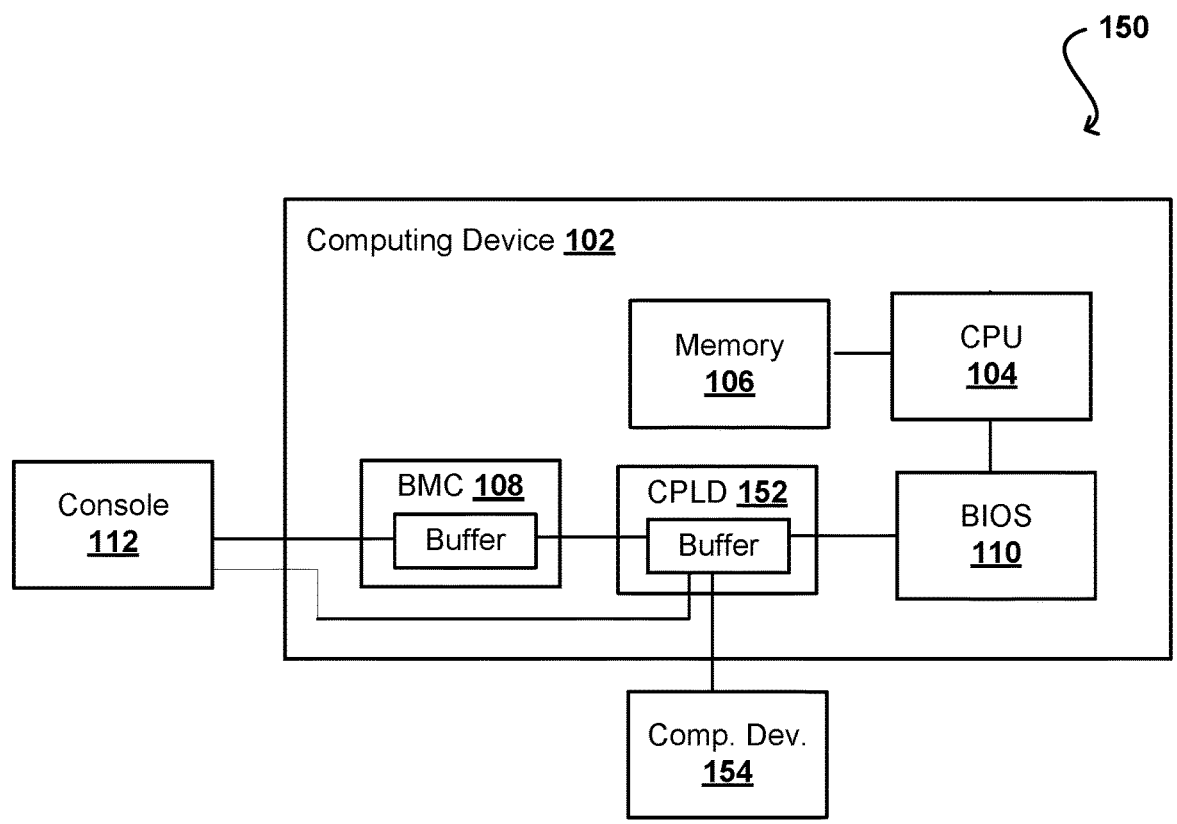

Accordingly, approaches in accordance with various embodiments can instead utilize a configuration 150 as illustrated in FIG. 1B. It should be understood that reference numbers may be carried over between figures for similar components for simplicity of explanation, but this should not be interpreted as a limitation on scope or variation of the various embodiments unless otherwise specifically stated. In this example, the computing device 102 does not include a direct interface between the BIOS 110 and BMC 108 for SEL events. In this configuration, a component or logic device, such as a complex programmable logic device (CPLD) 152, can sit "between" the BIOS 110 and the BMC 108 in the computing device 102. This CPLD 152 can be programmed to function at least in part as a logic device, or "SEL device," that can receive and store SEL events from the BIOS 110. Such a CPLD can be used for other purposes as well, such as to process data from other sources. Other logic devices can be used to receive, analyze, and cache such data, such as SEL event data, as well within the scope of the various embodiments, as may include a field-programmable gate array (FPGA), an application-specific integrated circuit (ASIC), or a microcontroller, among other such options. The SEL events in at least some embodiments can be stored to a persistent buffer in, or available to, the CPLD 152. In this way, the SEL messages can be retrieved by the BMC 108 asynchronously and when convenient (or at least possible) for the BMC 108. Such buffering prevents the BIOS from having to wait for an acknowledgement from the BMC, which might otherwise cause the BIOS to be delayed if the BMC is unable to respond in a timely fashion. In at least one embodiment, the CPLD 152 can implement logic to accept SEL events from the BIOS via SSIF and store at least a limited number of SEL events in a volatile or non-volatile memory buffer. In this example, the BMC 108 can use a separate SMBus or I²C interface to retrieve SEL events from the buffer of the CPLD, such as to drain the buffer and ensure that all SEL event data is received by the BMC 108.

Such an approach can be advantageous in at least one respect because the latency for adding SELs from the BIOS 110 to the CPLD 152 is deterministic, unlike when interacting with the BMC 108. In many instances, latency to the CPLD 152 should be significantly less than for the BMC 108 at least due to the fact that the latency is more predictable and stable in the concurrent logic of the CPLD. Further, the CPLD 152 can accept and buffer SEL events while the BMC 108 is unavailable, such as may be due to a reboot or upgrade, allowing the BMC 108 to retrieve missed SEL events when possible. If the CPLD 152 stores events in non-volatile memory then missed events can persist through a power cycle or similar event. In at least one embodiment, other devices can be used in place of a CPLD as well, such as a field-programmable gate array (FPGA), microcontroller, or application-specific integrated circuit (ASIC) that is able to operate as a state machine and store received data at least temporarily. Such an approach avoids issues with BMC functionality being primary software-driven in at least some implementations. Such an approach can also be beneficial in situations where the BMC 108 may be down or otherwise unavailable, such that without the intermediate SEL device the SEL event might time out and no SEL event data would ultimately be received by the BMC. Since SEL events typically relate to important events, such as uncorrectable memory errors or hardware errors, it can be critical in at least some embodiments for these messages to be received and available. In at least one embodiment, the BIOS can send a SEL event to what it thinks is the BMC but is instead a CPLD, or other SEL device, such that no modifications are necessary to the BIOS. The CPLD can receive and store the SEL event for subsequent, asynchronous retrieval by the BMC or another such component. If the BMC 108 is doing an update, for example, once the update has completed successfully the BMC 108 can ask the CPLD 152 whether there are any events for the BMC, and can then read those events and report them to backend services just as if the BMC had received the SEL messages directly from the BIOS 110.

In at least one embodiment, the CPLD 152 or other SEL device can timestamp SEL events as they are received and stored to a persistent buffer. These timestamps can help to provide a more accurate and complete record of when one or more events occurred. For example, a power loss may occur that impacts the computing device 102 before one or more SEL messages are received to the BMC 108. By storing the SEL messages in non-volatile memory of the CPLD 152, these SEL messages can be available after a restoration of power, such that the information in these SEL events would not be lost as a result of the power event. The timestamps can help determine a sequencing of the SEL events, to provide for more accurate restoration for a particular point in time or system state.

In at least one embodiment, use of a SEL device such as a CPLD 152 can also provide additional access to the SEL event data. In conventional systems, SEL event data may only be available through the BMC 108. A SEL device such as a CPLD 152 can enable an external component, application, or system to access SEL message data that may not yet have been received by the BMC, or is available even if the BMC may not be. For example, another computing device 154, such as a system on chip (SoC) or pluggable computing device, may be able to access the SEL data from the CPLD 152. Further, a console 112 may be able to access SEL data from either the BMC 108 or the CPLD 152, or both. In at least some embodiments, such availability of the SEL data may enable the BMC to no longer be needed for such purposes, taking the BMC out of the critical path for receiving SEL events.

In at least some embodiments, a SEL device such as a CPLD 152 can function as a state machine at least for purposes of SEL messages. The CPLD 152 can accept traffic such as I²C traffic, and on top of that SSIF traffic, such that it can function as a state machine for receiving SEL commands. When a SEL message is received, the state machine can process that data and store it to a secondary buffer or other such location. A CPLD used to implement such functionality can be any appropriate CPLD, at least that has sufficient logic cells to implement this functionality, and may have internal non-volatile memory cells for persisting the SEL data. In other embodiments the CPLD at least needs to be able to access external persistent storage for the SEL data.

In at least some embodiments, a higher speed interface can be utilized between the CPLD 152 and the BIOS 110 that could be specific to this purpose, as an SSIF interface may be at least somewhat slower. The use of a higher speed interface can help further reduce the latency of SEL message receipt and storage. In at least one embodiment, a high speed interface such as a PCIe (peripheral component interconnect express) bus could be used to transfer SEL messages directly into a buffer in the CPLD, for subsequent retrieval by the BMC or another such component. In at least one embodiment, the BMC would retrieve these messages from the CPLD over an interface such as an I²C interface.

In various embodiments, there may be other devices 154 or components that can access event data buffered in a SEL device such as a CPLD. This can include, for example, a peripheral device or card that includes processing capability, and which may be connected to the computing device 102 to perform one or more tasks. Such a device can have the ability to read and write various status registers within the CPLD 152. In at least one embodiment, such an interface can be configured or extended to be able to read cached events. In some embodiments, a CPLD 152 can be configured to store SEL events even after they are read by the BMC, rather than discard them, so that they are available for retrieval or access by other systems, components, or applications. In at least one embodiment, these messages could be retained over the course of a system boot or a certain number of events, such that firmware running on this computing device 154 can determine the progress of the boot, to determine whether it has reached certain milestones. There can be various reasons why such a device might want to know that a boot has reached a certain point, or that the BIOS portion of the boot has completed, so that this device knows that it can safely perform certain operations. Further, there may be various components that can retrieve and clear a BMC event log, so it may be desirable to store this information in a second location to ensure that the information is available if it is to be retrieved by a second component or otherwise at a later time. Such an approach can be used to provide an "intelligent buffer," where this buffer provides a reliable and persistent record of events that occurred during a system boot, where the intelligence enables the CPLD to be aware of the state of the system such that useful boot milestone data is preserved. Such a buffer can provide immediate access to the SEL data, and can specifically capture a subset of data that passes through the interface and is time sensitive, as the CPLD may be used for other data flows as well. Certain commands may be passed through, which time sensitive or important commands are buffered until they can be retrieved by the BMC. In at least one embodiment, however, more granular data can be stored for subsequent debugging or analysis.

Figure 2:
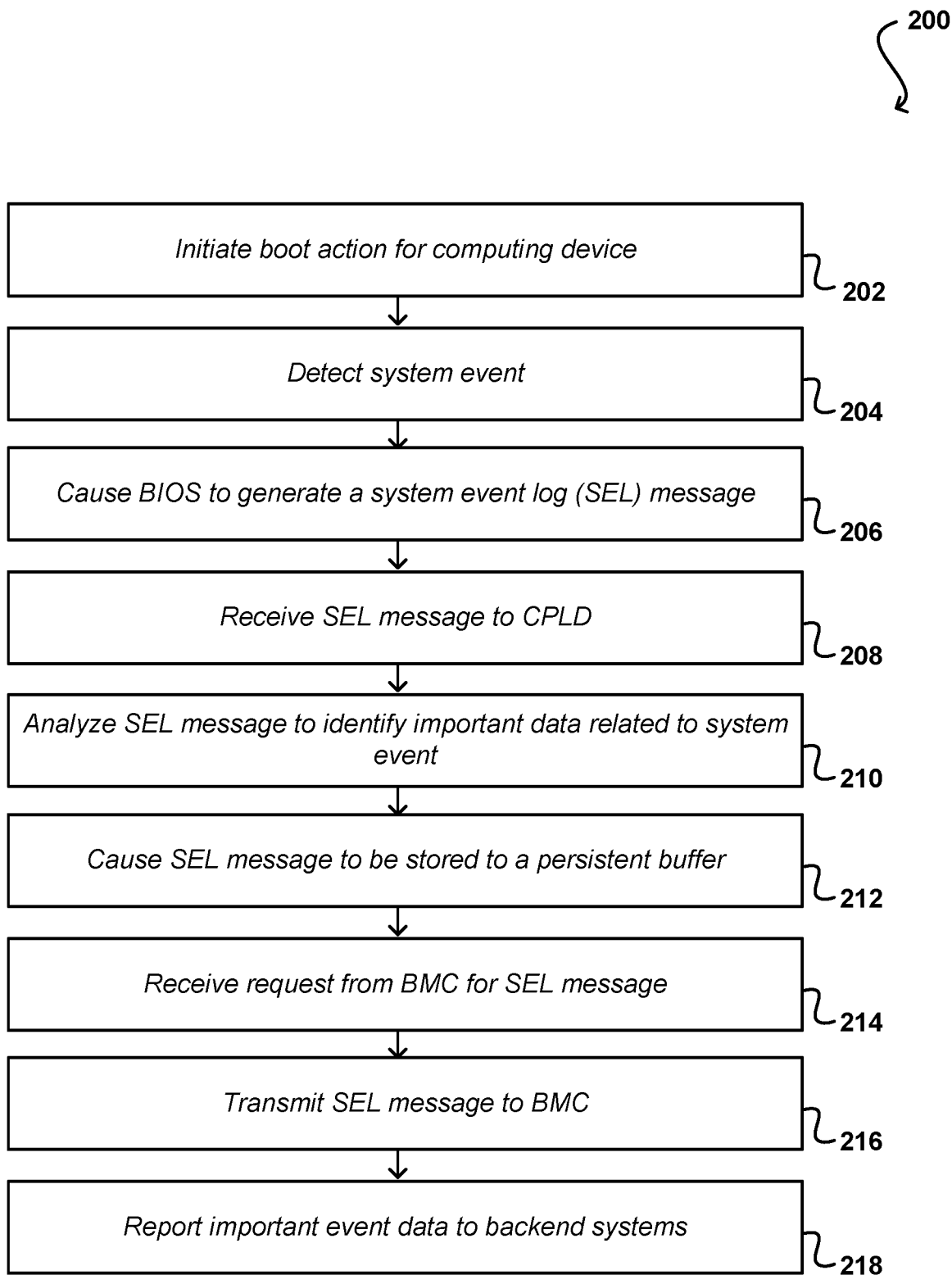
FIG. 2 illustrates an example process for transmitting a system event log message that can be generated in accordance with various embodiments.

FIG. 2 illustrates an example process 200 for providing system event data that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, although system event log messages are used as an example, it should be understood that various other types of communications can benefit from aspects of the various embodiments as well, as would be apparent to one of ordinary skill in the art in light of the teachings and suggestions contained herein. In this example, a computing device such as a server undergoes or initiates 202 as action, as may relate to a boot procedure, during which time system BIOS is active but a user operating system is not active. Similar states can occur during a reboot or other such action as well that puts the server in a POST state, where the system BIOS has control over the server during a self-test and before an OS is executed. During such a process, a system event can be detected 204. This detection can occur on, or for, any appropriate component or service (e.g., a processor or memory) on the computing device, and may come from a monitoring function in a hardware device as well, among other such options. In response to receiving information about the detected event, the BIOS can be caused 206 to generate a system event log (SEL) message including information about the system event. In at least some embodiments, the BIOS can send the SEL message via an SSIF interface when the BIOS adds a SEL event during a system management interrupt (SMI). As mentioned, messages other than SELs can be sent using such a process as well, as may include power reset commands or commands to reset the BMC, among other such options. The SEL message sent from BIOS can be received 208 to a SEL device, such as a CPLD. The SEL device can analyze 210 the message to determine or identify that the message includes important information relating to a system event. The SEL device can then cause 212 data for the event to be stored to a persistent storage buffer, located internal or external to the SEL device. Subsequently, a request can be received 214 from the BMC for the SEL message data. The SEL data can then be transmitted 216 from the persistent buffer of the SEL device to the BMC, which can then analyze that data and report 218 any important event data to one or more backend systems, just as if the BMC had received the SEL messages directly from the BIOS. In such an approach, however, the event data is not lost due to any delay on the part of the BMC. In at least one embodiment, the buffer can also store the data for retrieval by one or more other components, in addition to the BMC. After boot is completed in this example, a user OS can be provisioned, executed, or resumed on the computing device.

Figure 3:
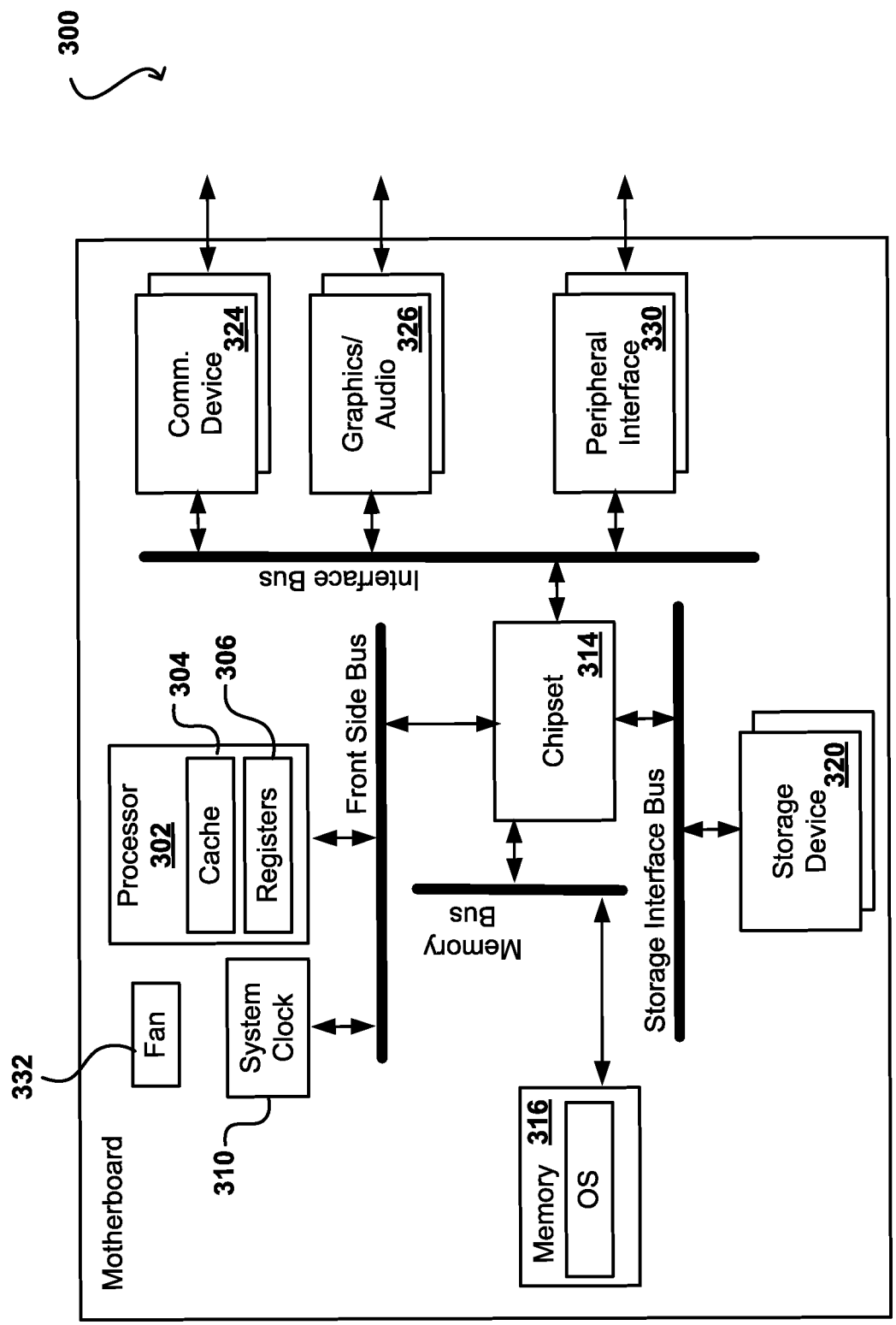
FIG. 3 illustrates components of an example computing device that can be utilized in accordance with various embodiments.

Computing resources, such as servers, that can transmit messages such as SEL messages will generally include at least a set of standard components configured for general purpose operation, although various proprietary components and configurations can be used as well within the scope of the various embodiments. FIG. 3 illustrates components of an example computing device 300 that can be utilized in accordance with various embodiments. As known for computing devices, the computer will have one or more processors 302, such as central processing units (CPUs), graphics processing units (GPUs), and the like, that are electronically and/or communicatively coupled with various components using various buses, traces, and other such mechanisms. A processor 302 can include memory registers 306 and cache memory 304 for holding instructions, data, and the like. In this example, a chipset 314, which can include a northbridge and southbridge in some embodiments, can work with the various system buses to connect the processor 302 to components such as system memory 316, in the form or physical RAM or ROM, which can include the code for the operating system as well as various other instructions and data utilized for operation of the computing device. The computing device can also contain, or communicate with, one or more storage devices 320, such as hard drives, flash drives, optical storage, and the like, for persisting data and instructions similar, or in addition to, those stored in the processor and memory. The processor 302 can also communicate with various other components via the chipset 314 and an interface bus (or graphics bus, etc.), where those components can include communications devices 324 such as cellular modems or network cards, media components 326, such as graphics cards and audio components, and peripheral interfaces 330 for connecting peripheral devices, such as printers, keyboards, and the like. At least one cooling fan 332 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 302 can obtain data from physical memory 316, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 304 in at least some embodiments. The computing device 300 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 330, a communication device 324, a graphics or audio card 326, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 302 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 4:
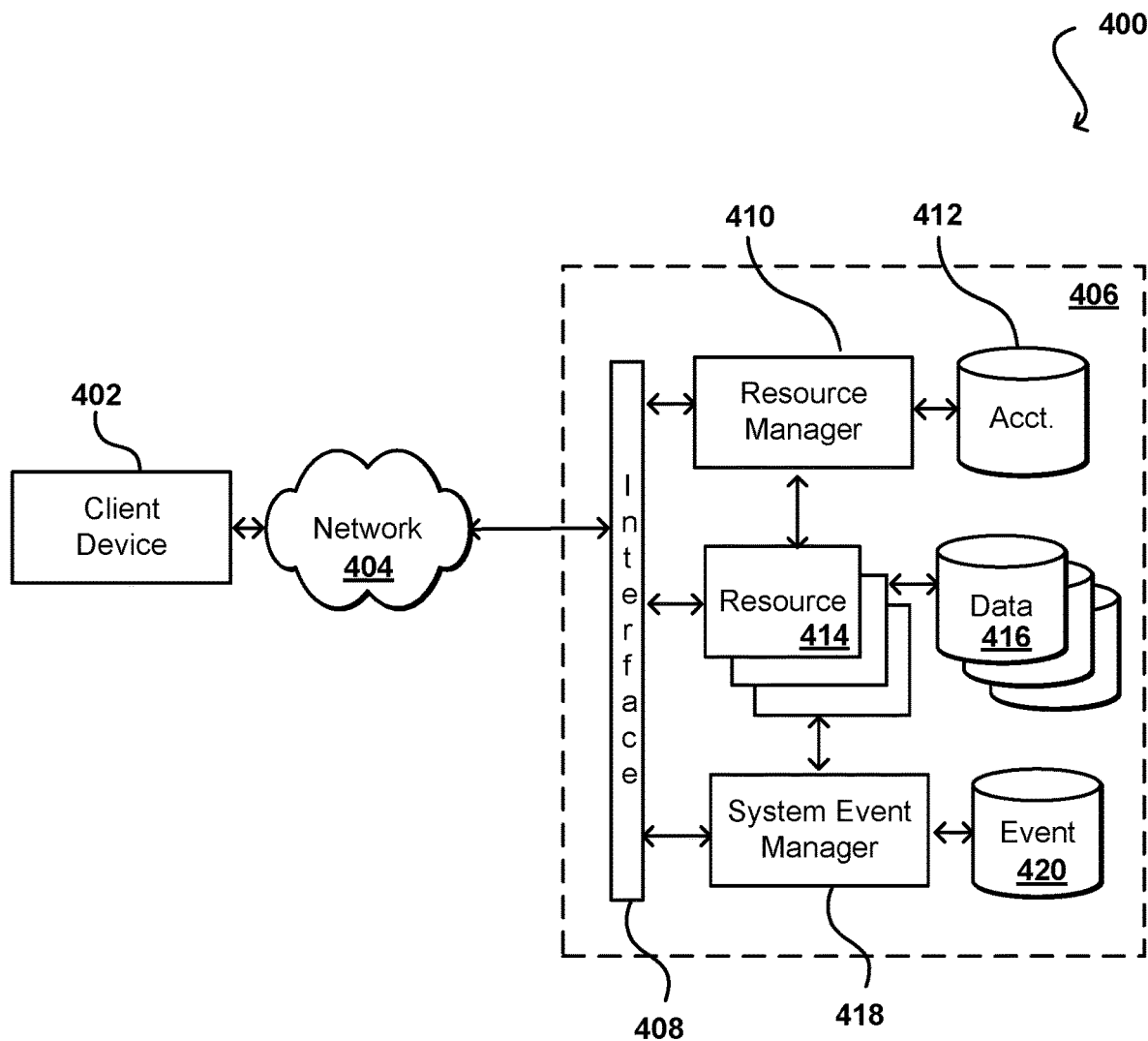
FIG. 4 illustrates components of an example resource environment that can be utilized in accordance with various embodiments.

FIG. 4 illustrates an example environment 400 in which aspect of various embodiments can be implemented. Such an environment can be used in some embodiments to provide resource capacity for one or more users, or customers of a resource provider, as part of a shared or multi-tenant resource environment. In this example a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 406 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
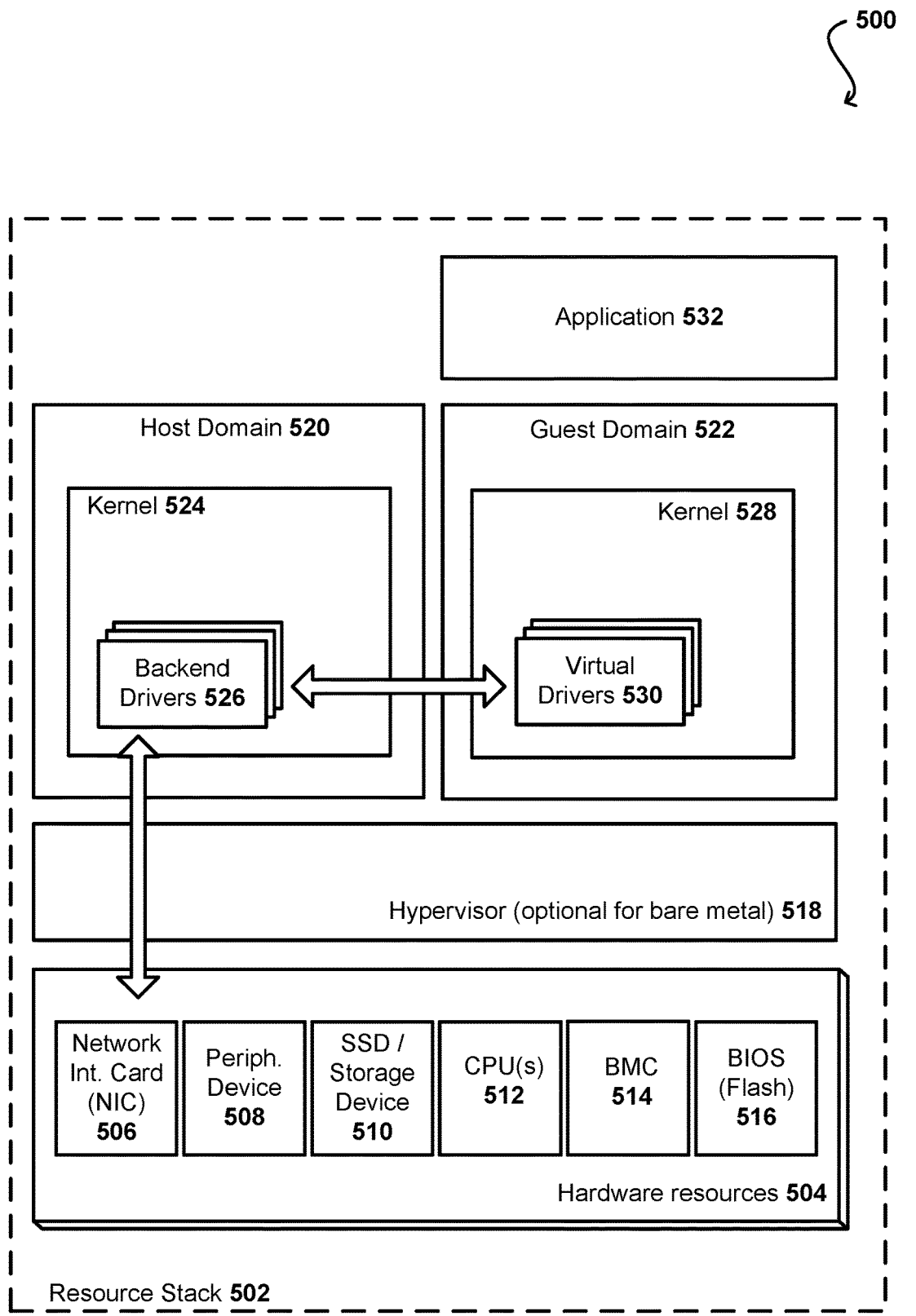
FIG. 5 illustrates an example resource stack for a computing device that can be utilized in accordance with various embodiments.

FIG. 5 illustrates an example resource stack 502 of a physical resource 500 that can be utilized in accordance with various embodiments. Such a resource stack 502 can be used to provide an allocated environment for a user (or customer of a resource provider) having an operating system provisioned on the resource. In accordance with the illustrated embodiment, the resource stack 502 includes a number of hardware resources 504, such as one or more central processing units (CPUs) 512; solid state drives (SSDs) or other storage devices 510; a network interface card (NIC) 506, one or more peripheral devices (e.g., a graphics processing unit (GPU), etc.) 508, a BIOS implemented in flash memory 516, and a baseboard management controller (BMC) 514, and the like. In some embodiments, the hardware resources 504 reside on a single computing device (e.g. chassis). In other embodiments, the hardware resources can reside on multiple devices, racks, chassis, and the like. Running on top of the hardware resources 504, a virtual resource stack may include a virtualization layer such as a hypervisor 518 for a Xen-based implementation, a host domain 520, and potentially also one or more guest domains 522 capable of executing at least one application 532. The hypervisor 518, if utilized for a virtualized environment, can manage execution of the one or more guest operating systems and allow multiple instances of different operating systems to share the underlying hardware resources 504. Conventionally, hypervisors are installed on server hardware, with the function of running guest operating systems, where the guest operating systems themselves act as servers.

In accordance with an embodiment, a hypervisor 518 can host a number of domains (e.g., virtual machines), such as the host domain 520 and one or more guest domains 522. In one embodiment, the host domain 520 (e.g., the Dom-0) is the first domain created and helps virtualize hardware resources and manage all of the other domains running on the hypervisor 518. For example, the host domain 520 can manage the creating, destroying, migrating, saving, or restoring the one or more guest domains 522 (e.g., the Dom-U). In accordance with various embodiments, the hypervisor 518 can control access to the hardware resources such as the CPU, input/output (I/O) memory, and hypervisor memory.

A guest domain 522 can include one or more virtualized or para-virtualized drivers 530 and the host domain can include one or more backend device drivers 526. When the operating system (OS) kernel 528 in the guest domain 522 wants to invoke an I/O operation, the virtualized driver 530 may perform the operation by way of communicating with the backend device driver 526 in the host domain 520. When the guest driver 530 wants to initiate an I/O operation (e.g., to send out a network packet), a guest kernel component can identify which physical memory buffer contains the packet (or other data) and the guest driver 530 can either copy the memory buffer to a temporary storage location in the kernel for performing I/O or obtain a set of pointers to the memory pages that contain the packet(s). In at least one embodiment, these locations or pointers are provided to the backend driver 526 of the host kernel 524 which can obtain access to the data and communicate it directly to the hardware device, such as the NIC 506 for sending the packet over the network.

It should be noted that the resource stack 502 illustrated in FIG. 5 is only one possible example of a set of resources that is capable of providing a virtualized computing environment and that the various embodiments described herein are not necessarily limited to this particular resource stack. In some embodiments, the guest domain 522 may have substantially native or "bare metal" access to the NIC 506 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 514 can maintain a list of events that have occurred in the system, referred to herein as a system event log (SEL). In at least one embodiment, the BMC 514 can receive system event logs from the BIOS 516 on the host processor. The BIOS 516 can provide data for system events over an appropriate interface, such as an I$^2$C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 518 can prevent the guest operating system, or guest domain 522, from sending such system event log data to the BMC 514. In the case of bare metal access without such a hypervisor, however, user instances can have the ability to send data for system event that spoof events from the BIOS 516. Such activity could lead to compromised bare metal instances being prematurely degraded due to fake system event data produced by the user OS.

In at least one embodiment, however, there will be portions of the physical resource 500 that will be inaccessible to the user OS. This can include, for example, at least a portion of BIOS memory 516. BIOS memory 516 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 516 at boot time, before a user OS is executing on the resource. Once the user OS is executing on the resource, that OS will be prevented from accessing that secret token in BIOS memory 516. In at least one embodiment, this secret token (or other stored secret) can be provided to the BMC 514 when adding system event log events, whereby the BMC 514 can confirm that the event is being sent by the BIOS 516 and not by the user OS.

Figure 6:
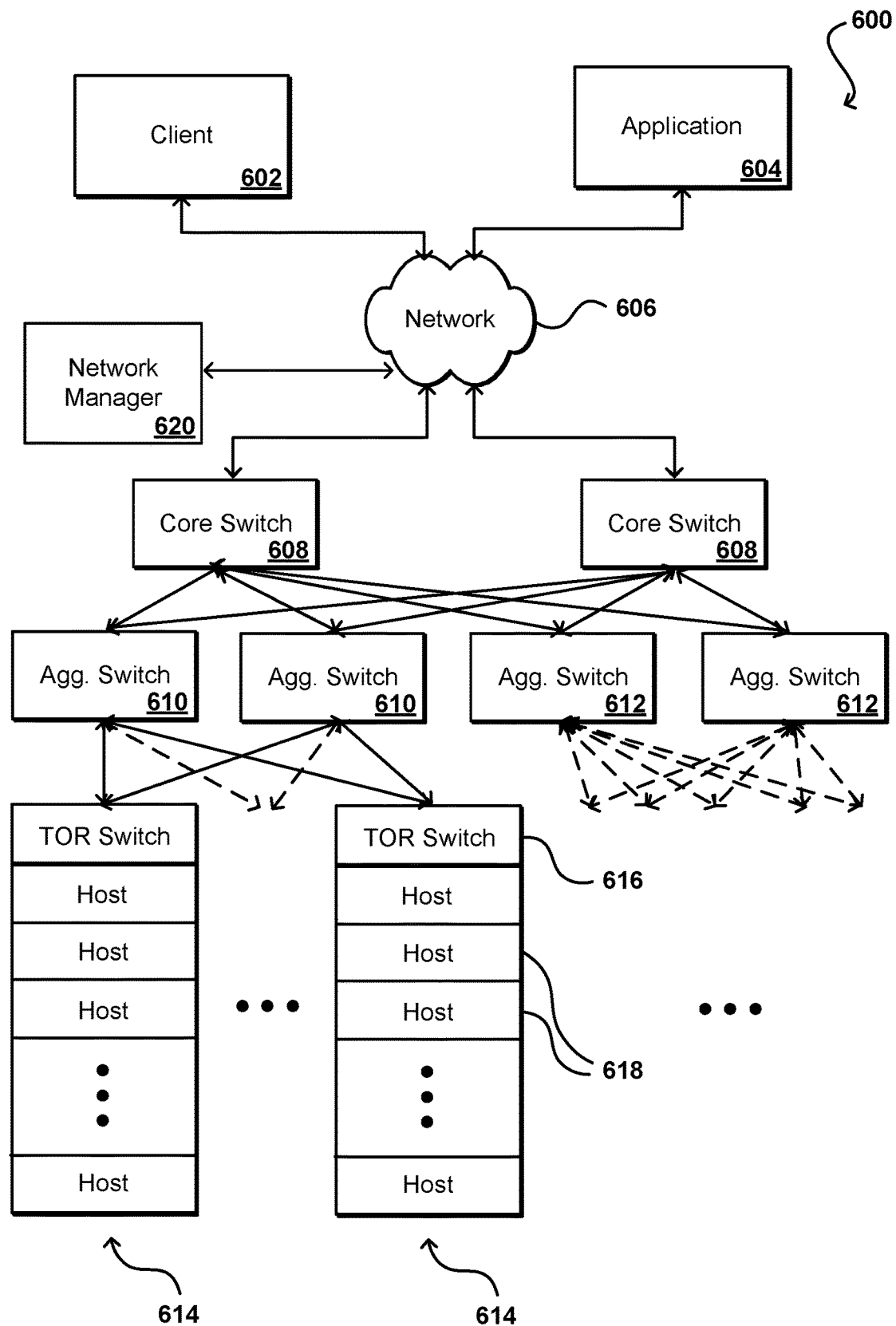
FIG. 6 illustrates components of an example environment in which aspects of the various embodiments can be implemented.

As mentioned, in many instances the live updating of BIOS for a server can occur in a shared resource environment, such as a data center or server farm. FIG. 6 illustrates an example network configuration 600 that can be used to route communications between specific host machines or other such devices in such an environment. This example shows a typical design that can be used for a data center, wherein a source such as a client device 602 or application 604 is able to send requests across at least one network 606, such as the Internet or a cellular network, to be received by one or more components of the data center. Properties of various components of the network, such as provisioned instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java©, C, C# or C++ or any scripting language, such as Perl, Python or TCL, as well as combinations thereof. The server(s) may also include database servers, including without limitation those commercially available from Oracle©, Microsoft©, Sybase© and IBM© as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting, on a computing device, a system event;
   generating, by Basic Input Output System (BIOS) on the computing device, a system event log (SEL) message corresponding to the system event;
   receiving the SEL message to a complex programmable logic device (CPLD);
   determining, by the CPLD, that the SEL message relates to the system event;
   causing the SEL message to be stored to a persistent buffer for the CPLD;
   receiving, from a baseboard management controller (BMC), a request for one or more SEL messages stored to the persistent buffer; and
   transmitting the SEL message from the persistent buffer for the CPLD to the BMC, wherein the BMC is enabled to perform one or more actions for the system event.

2. The computer-implemented method of claim 1, further comprising:
   applying a timestamp to the SEL message before causing the SEL message to be stored to the persistent buffer.

3. The computer-implemented method of claim 1, further comprising:
   transmitting the SEL message from the BIOS using an SMBus System Interface (SSIF); and
   transmitting the SEL message from the persistent buffer for the CPLD to the BMC using an I2C bus.

4. The computer-implemented method of claim 1, further comprising:
   receiving, from an external component, a request for one or more SEL messages stored to the persistent buffer; and
   transmitting the SEL message to the external component independent of whether the SEL message has been transmitted to the BMC.

5. The computer-implemented method of claim 1, further comprising:
   causing the CPLD to function as a state machine for the computing device, wherein the state information is updated using event information in the received SEL event.

6. A computer-implemented method, comprising:
   detecting, on a computing device, a system event;
   sending, by a source component on the computing device to a target recipient, a system event message corresponding to the system event;
   receiving the system event message to a logic device;
   determining, by the logic device, that the system event message relates to the system event;
   causing, by the logic device, the system event message to be stored to a persistent buffer; and
   enabling the system event message to be retrieved from persistent buffer by the target recipient.

7. The computer-implemented method of claim 6, wherein the source component is a Basic Input Output System (BIOS) on the computing device.

8. The computer-implemented method of claim 6, wherein the logic device is a complex programmable logic device (CPLD), a field-programmable gate array (FPGA), an application-specific integrated circuit (ASIC), or a microcontroller.

9. The computer-implemented method of claim 6, wherein the target recipient is a baseboard management controller (BMC) on the computing device.

10. The computer-implemented method of claim 6, wherein the system event message is a system event log (SEL) message for the system event, the system event relating to a hardware error or a software error on the computing device.

11. The computer-implemented method of claim 6, further comprising:
    causing the logic device to function as a state machine for the computing device, wherein the state information is updated using event information in the received system event message.

12. The computer-implemented method of claim 6, further comprising:
    applying a timestamp to the system event message before causing the system event message to be stored to the persistent buffer.

13. The computer-implemented method of claim 6, further comprising:
    transmitting the system event message from the source component using an SMBus System Interface (SSIF); and
    transmitting the system event message from the persistent buffer to the target recipient using an I2C bus.

14. The computer-implemented method of claim 6, further comprising:
    receiving, from an external component, a request for one or more messages stored to the persistent buffer; and
    transmitting the system event message to the external component independent of whether the system event message has been transmitted to the target recipient.

15. The computer-implemented method of claim 6, further comprising:
    performing an action in response to data for a system event contained in a system event message, the action including determining a cause of the system event, performing a remedial action, logging the data, or forwarding the data to an external system event manager.

16. A system, comprising:
    a basic input/output system (BIOS) component to detect a system event on a computing device and transmit a system event log (SEL) message corresponding to the system event;
    a complex programmable logic device (CPLD) to receive the SEL message from the BIOS component and determine that the SEL message relates to the system event, the CPLD further to cause the SEL message to be stored to a persistent buffer for the CPLD; and
    a baseboard management controller (BMC) to request, from the CPLD, one or more SEL messages stored to the persistent buffer, the BMC upon receiving the SEL message enabled to perform one or more actions for the system event.

17. The system of claim 16, wherein the CPLD is further to apply a timestamp to the SEL message before causing the SEL message to be stored to the persistent buffer.

18. The system of claim 16, wherein the SEL message is transmitted from the BIOS to the CPLD using an SMBus System Interface (SSIF), and wherein the SEL message is transmitted from the persistent buffer for the CPLD to the BMC using an I2C bus.

19. The system of claim 16, wherein the CPLD includes an interface enabling a request to be received, from an external component, for one or more SEL messages stored to the persistent buffer, the interface further enabling the CPLD to transmit the SEL message to the external component independent of whether the SEL message has been transmitted to the BMC.

20. The system of claim 16, wherein the CPLD functions as a state machine for the computing device, and wherein the state information is updated using event information in the received SEL event.

* * * * *